(12) United States Patent
Webber et al.

(10) Patent No.: US 6,191,936 B1
(45) Date of Patent: Feb. 20, 2001

(54) CAPACITOR HAVING TEXTURED PELLET AND METHOD FOR MAKING SAME

(75) Inventors: Dean A. Webber, Pembroke, NH (US); John E. Van Voorhis, Shapleigh, ME (US)

(73) Assignee: Vishay Sprague, Inc., Stanford, ME (US)

( * ) Notice: Under 35 U.S.C. 154(b), the term of this patent shall be extended for 0 days.

(21) Appl. No.: 09/289,995

(22) Filed: Apr. 12, 1999

(51) Int. Cl.$^7$ .............................. H01G 9/145; H01G 9/00; H01G 9/04
(52) U.S. Cl. ........................... 361/528; 361/524; 361/532
(58) Field of Search .................................. 361/523–529, 361/531–533; 29/25.03

(56) References Cited

U.S. PATENT DOCUMENTS

| | | | |
|---|---|---|---|
| 3,345,545 | * 10/1967 | Bourgault et al. | 361/529 |
| 4,090,231 | * 5/1978 | Millard et al. | 361/529 |
| 4,943,892 | * 7/1990 | Tsuchiya et al. | 361/525 |
| 5,075,940 | * 12/1991 | Kuriyama et al. | 29/25.03 |
| 5,586,001 | * 12/1996 | Amano et al. | 361/525 |
| 5,949,639 | * 9/1999 | Maeda et al. | 361/523 |
| 5,951,840 | * 9/1999 | Fukaumi et al. | 205/173 |
| 5,959,831 | * 9/1999 | Maeda et al. | 361/523 |
| 5,965,062 | * 10/1999 | Sakata et al. | 252/500 |
| 6,042,740 | * 3/2000 | Uehara et al. | 252/62.2 |

* cited by examiner

Primary Examiner—Kristine Kincaid
Assistant Examiner—Eric Thomas
(74) Attorney, Agent, or Firm—Zarley, McKee, Thomte, Voorhees & Sease

(57) ABSTRACT

A pellet for use in a capacitor includes a rectangular body formed from compressed and sintered particles of conductive material. The body has an exterior surface which is textured to form a plurality of indentations therein. The profile of the textured surface in cross section is selected from the group including essentially of a curved profile, a sine shape profile, a rectangular shaped profile, a U-shaped profile, and a V-shaped profile.

29 Claims, 4 Drawing Sheets ed States Patent...

CAPACITOR HAVING TEXTURED PELLET AND METHOD FOR MAKING SAME

BACKGROUND OF THE INVENTION

The present invention relates to a capacitor having a textured pellet and a method for making same.

Solid tantalum capacitors and solid niobium capacitors use as anodes porous pellets which are compressed from fine tantalum or niobium powder. The pellets are first compressed and then they are sintered in a vacuum. The porous structure of the anode provides a high surface area and thereby high specific charge (CV) of the finished capacitor (where CV refers to capacitance and rated voltage). Generally tantalum and niobium pellets contain a lead wire made of the same metal as the compressed powder. The lead wire is attached to the pellet either by welding after the pellet has been sintered, or by embedding in the pellet before the pellet is pressed and sintered.

Prior art efforts have been made to increase the surface area of the pellet by fluting the exterior surface of a cylindrical pellet, or by forming elongated bores or channels in the interior of the pellet. In these prior art efforts the press dye forming the pellet determines the shape and configuration of the pellet, and hence of the anode. A large part of the available pellet volume is lost in these prior art efforts, and the ability to coat the outside surface of these pellets was not enhanced.

FIG. 8 illustrates one of these prior art devices which includes a cylindrical body 10 having elongated flutes 12 extending along the length thereof. This capacitor removes a great deal of the volume of the body 10 and does not significantly enhance the ability of the manganese oxide layer to adhere to the outer surface of the body 10.

FIG. 10 shows another prior art body 14 having two or more elongated bores 16 extending therethrough. This increases the surface area of the body, but removes a significant volume, thereby reducing the overall capacitance of the body.

Therefore, a primary object of the present invention is the provision of an improved capacitor having a textured pellet and method for making same.

A further object of the present invention is the provision of a capacitor having a textured pellet which increases the adhesive characteristic for the coating which is coated on the outside surface of the pellet.

A further object of the present invention is the provision of an improved capacitor having a textured pellet which improves the consistency of the ESR distribution from capacitor to capacitor and results in reduced failures related to any penetration of conductive coatings through cracks or voids.

A further object of the present invention is the provision of an improved capacitor which lowers ESR of the capacitors at mid to high frequency and increases the adhesive strength of the $MnO_2$ coating on the exterior of the pellet significantly.

SUMMARY OF THE INVENTION

The foregoing objects may be achieved by a pellet for use in a capacitor comprising a rectangular body formed of compressed and sintered particles of a conductive material. The body has an exterior surface which includes a textured portion comprising a plurality of indentations therein.

The indentations have a depth of from 0.254 mm to 0.508 mm. Similarly the indentations have a width of from 0.254 to 0.508 mm.

The indentations may take various forms including the form of elongated channels having a profile in cross section which is selected from the group consisting essentially of a curved profile, a sine shaped profile, a rectangular shaped profile, a U-shaped profile, and a V-shaped profile. Other cross sectional profiles may be used without detracting from the invention.

BRIEF DESCRIPTION OP THE FIGURES OF THE DRAWINGS

DETAILED DESCRIPTION OF THE PREFERRED EMBODIMENT

Figure 1:
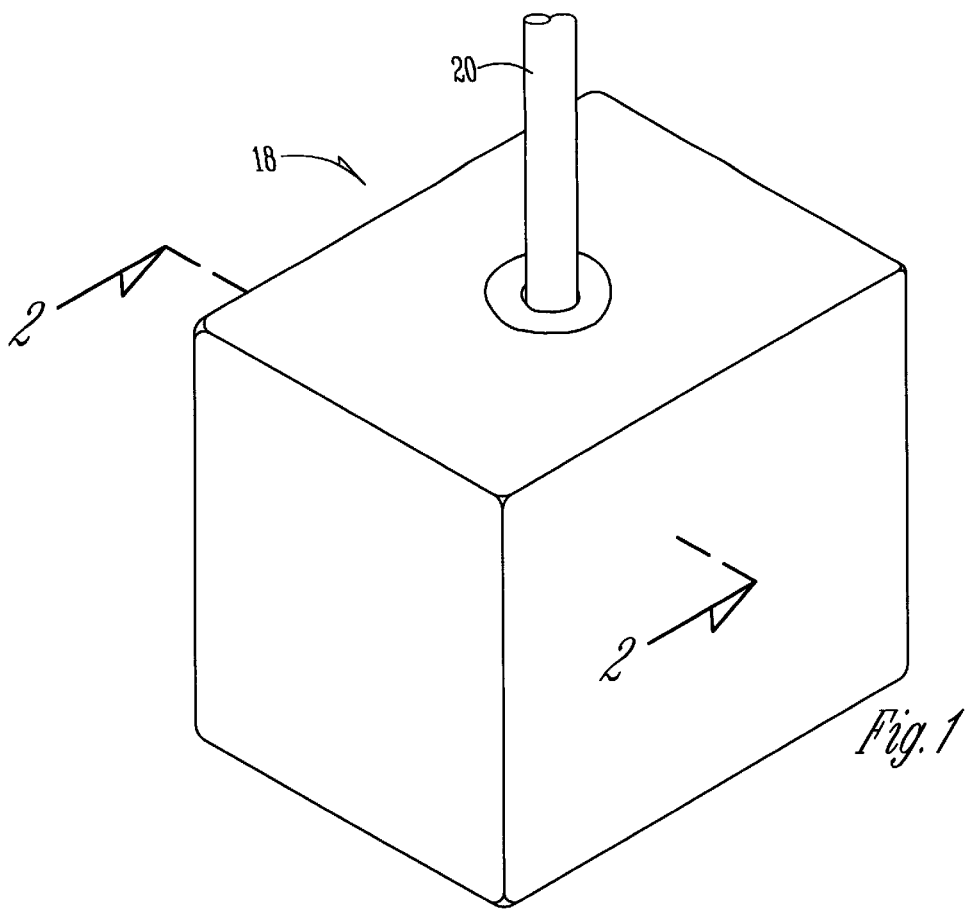
FIG. 1 is a perspective view of a capacitor made according to the present invention.
Figure 2:
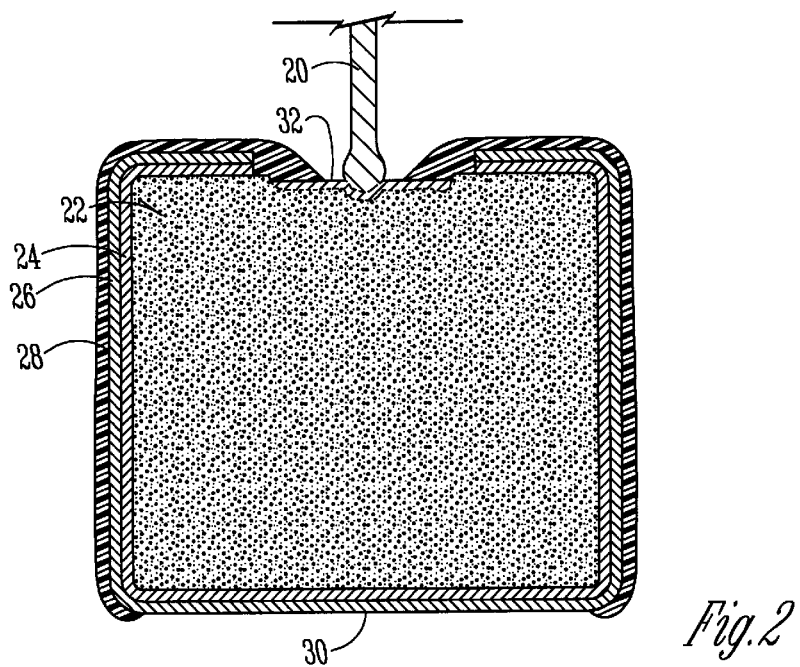
FIG. 2 is a sectional view taken along line 2—2 of FIG. 1.

Referring to FIGS. 1 and 2 a capacitor 18 includes an anode lead wire 20 extending therefrom. Capacitor 18 includes at its center a rectangular pellet 22. While the shape of the pellet 22 may vary, it is preferred that the shape be rectangular so that it can provide a flat surface for mounting on a circuit board. Extending around the outer surface of the pellet 22 is a manganese oxide ($MnO_2$) coating 24. Extending over the maganese coating 24 is a an additional conductive coating 26 which may be nickel, silver or other high conductive metal. Covering the entire component is a dielectric coat 28 which leaves the bottom portion 30 of the conductive coat 26 exposed so that it can be electrically connected in a circuit. Lead wire 20 is welded at a weld joint 32 to the rectangular pellet body 22. The pellet body 22 may be formed of compressed sintered particles of niobium or tantalum which are first compressed into the shape of the body 22 and then are sintered at a high temperature in a vacuum.

Figures 3, 4:
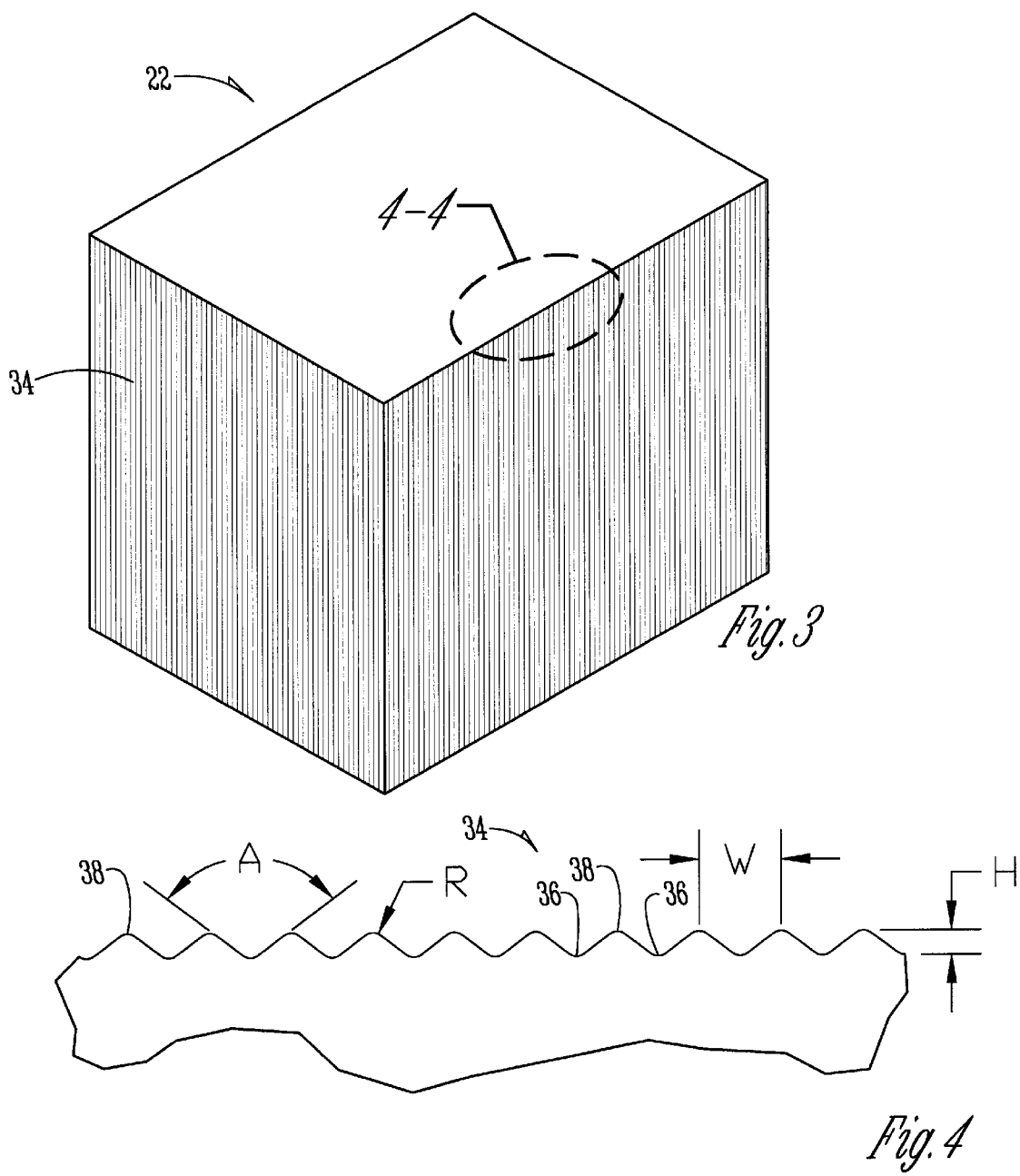
FIG. 3 is a perspective view of a pellet containing the textured surface of the present invention.
FIG. 4 is an enlarged sectional view showing the profile of the textured surface of FIG. 3.

Referring to FIG. 3 the present invention contemplates texturing all or some of the surfaces of the pellet 22. As shown in FIG. 3 a textured surface 34 extends around the sides of the pellet 22, leaving the upper and lower surfaces flat.

FIG. 4 shows an enlarged cross sectional profile of the textured surface 34 which includes a plurality of elongated channels 36 and a plurality of peaks 38 which form a sine shaped profile. The height H of the peaks 38 preferably varies from approximately 0.254 mm to approximately 0.508 mm. The width W between the peeks is also between 0.254 mm and 0.508 mm. The angle A is preferably at approximately 74°, but this angle may be varied without detracting from the invention.

Figure 5:
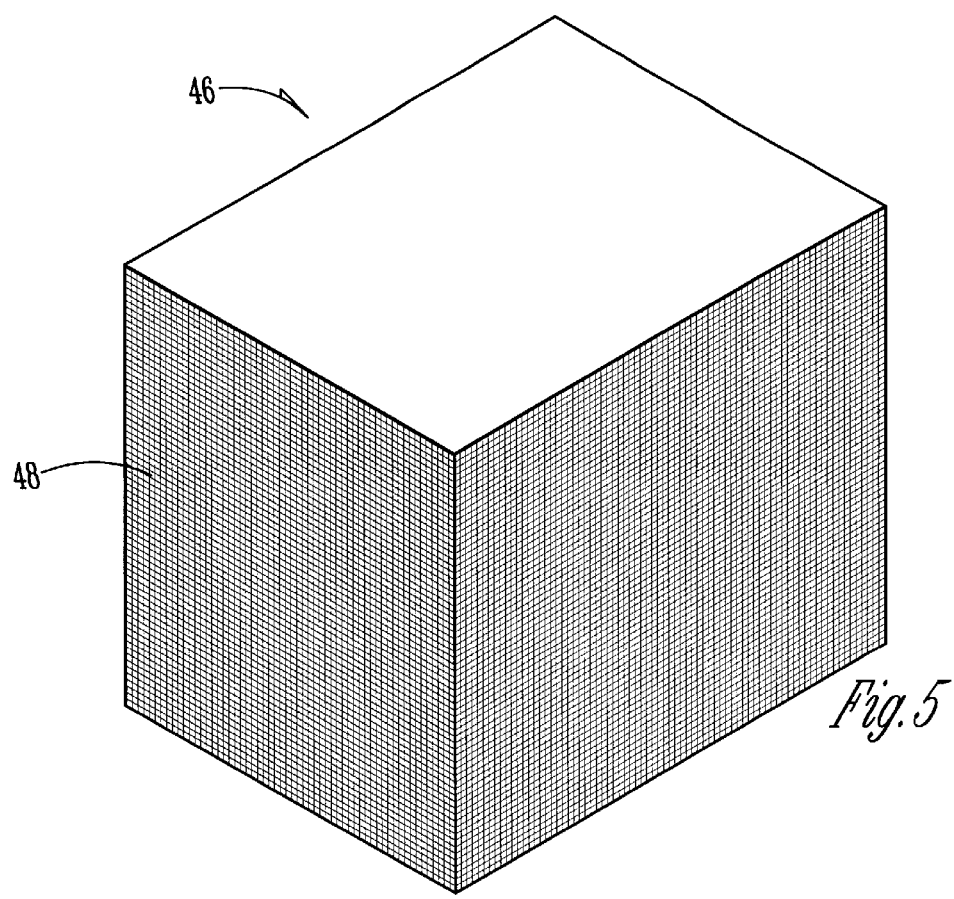
FIG. 5 is a perspective view of a modified form for the textured pellet.
Figure 6:
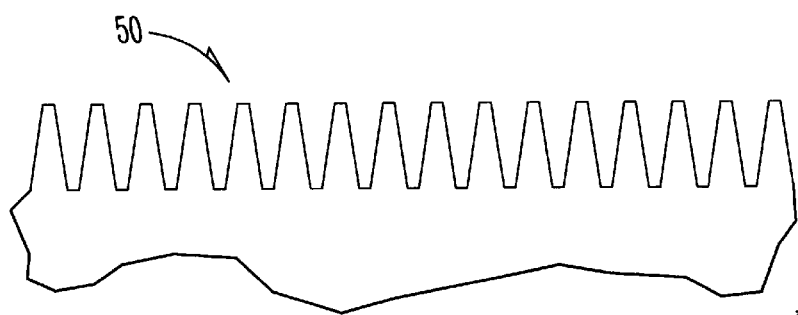
FIGS. 6 and 7 are cross sectional schematic views showing the various other types of cross sectional configurations which may be provided for the textured surface.
Figure 7:
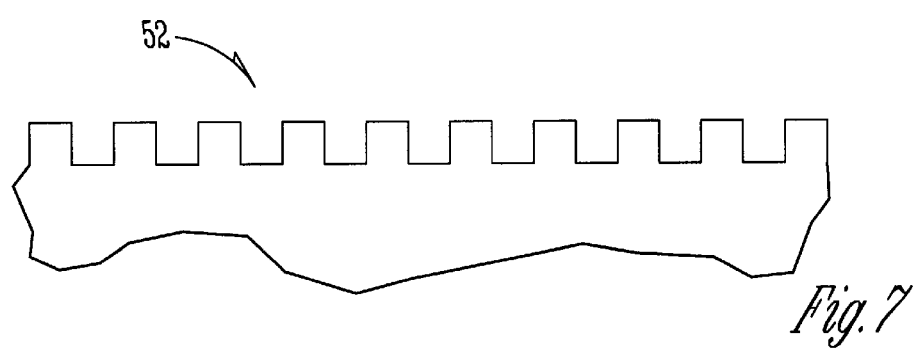
Figure 8:
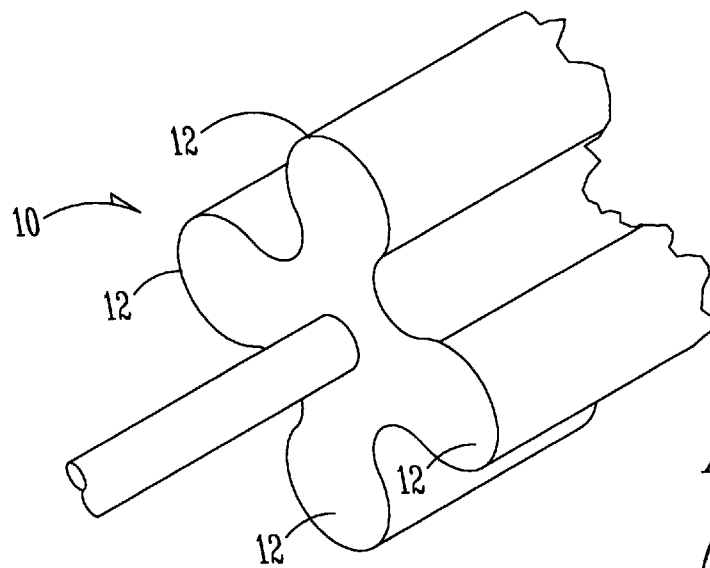
FIG. 8 is a partial perspective view of a prior art capacitor.
Figure 9:
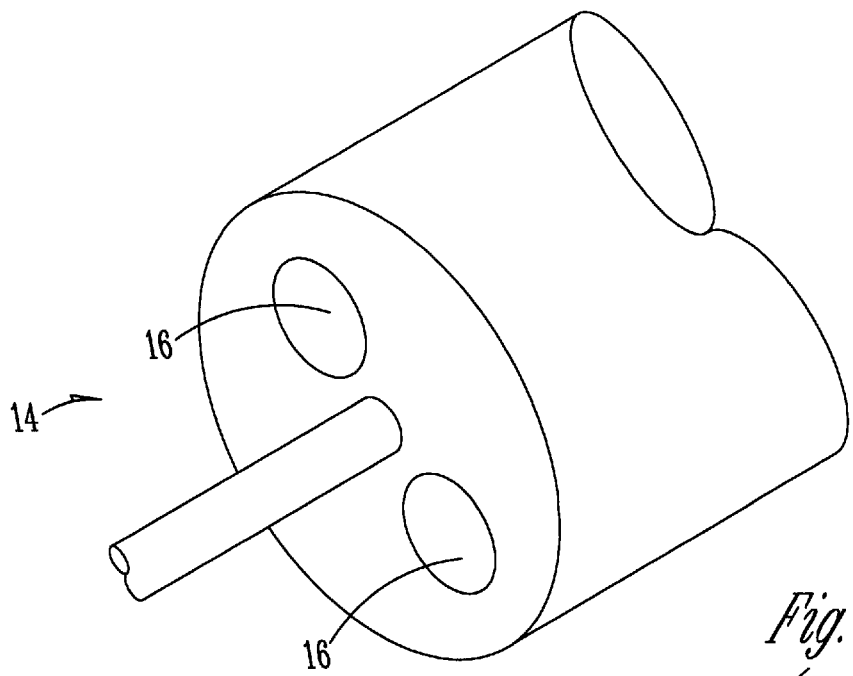
FIG. 9 is a partial perspective view of another type of prior art capacitor.

FIG. 5 shows an alternate form of pellet 46 having a textured surface 48 which is in a criss cross pattern. Other patterns such as diamond shaped patterns or other variations may be used without detracting from the invention. FIG. 6 shows an alternative form designated by the numeral 50 showing a V-shaped pattern, and FIG. 7 schematically shows a rectangular shaped pattern 52. Similarly U-shaped patterns, or other configurations can be used to create the textured surfaces 34 or 48 on the surface of the pellet.

The particular textured pattern is embossed on to the pellets during the pressing process. The pressing tool is engraved to produce the desired result. By using the dimensions set forth above for the peaks and valleys of the textured area, an addition of approximately 30% may be obtained to the external surface area of the pellet faces, compared to smooth planar faces. Other combinations of depth and width are possible as well, as long as the ability to press the pellet into a permanent shape is possible. Increasing the surface area in this way lowers ESR of the capacitors at mid to high frequency, and increases adhesive strength of the $MnO_2$ coating 24 significantly. This texturing also improves the consistency of ESR distribution from one part to another during manufacturing, and can result in reduced failures related to any penetration of conductive coatings through cracks or voids.

An example of the effect of the surface texturing of the present invention was shown on a 330 μfd 10V capacitor. The average ESR was 0.032 ohms without surface texturing. When the surface was textured the average ESR dropped to approximately 0.0235 ohms.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A pellet for use in a capacitor, comprising:
   a rectangular body comprised of compressed and sintered particles of conductive material, said body having an exterior surface;
   said exterior surface having a textured portion comprising a plurality of indentations therein;
   said indentations having a depth of from 0.254 mm to 0.508 mm;
   said indentations having a width of from 0.254 mm to 0.508 mm.

2. A pellet according to claim 1, where said indentations comprise a plurality of elongated channels.

3. A pellet according to claim 2 wherein each of said channels has a profile in cross section which is selected from the group consisting essentially of a curved profile, a sine shaped profile, a rectangular shaped profile, a U-shaped profile, and a V-shaped profile.

4. A pellet according to claim 2 wherein said elongated channels are parallel to one another.

5. A pellet according to claim 2 wherein said plurality of elongated channels include a first group of channels which are parallel to one another and a second group of channels which are parallel to one another but are not parallel to said first group of channels.

6. A pellet according to claim 1, wherein said indentations are formed in said exterior surface of said body during sintering and compressing of said conductive particles to form said body.

7. A pellet according to claim 6, wherein said indentations comprise a plurality of elongated channels.

8. A pellet according to claim 7, wherein each of said channels has a profile in cross section which is selected from the group consisting essentially of a curved profile, a sine shaped profile, a rectangular shaped profile, a U-shaped profile, and a V-shaped profile.

9. A pellet according to claim 7, wherein said elongated channels are parallel to one another.

10. A pellet according to claim 7, wherein said plurality of elongated channels include a first group of channels which are parallel to one another and a second group of channels which are parallel to one another but are not parallel to said first group of channels.

11. A capacitor comprising:
    a body comprised of compressed and sintered particles of conductive material, said body having an exterior surface;
    said exterior surface having a textured portion comprising a plurality of indentations therein;
    a lead electrically connected to said body;
    a conductive cathode coating at least partially covering said body;
    a first dielectric material electrically insulating said particles of conductive material from said conductive cathode coating;
    a second dielectric material covering at least a portion of said cathode coating;
    said indentations having a width of from 0.254 mm to 0.508 mm;
    said indentations having a depth of from 0.254 mm to 0.508 mm.

12. A pellet for use as an anode in a solid capacitor, comprising:
    a rectangular body comprised of compressed and sintered particles of conductive material, said body having an exterior surface;
    said exterior surface having a textured portion therein;
    said textured portion comprising a plurality of indentations therein;
    said indentations having a depth of from 0.254 mm to 0.508 mm;
    said indentations having a width of from 0.254 mm to 0.508 mm.

13. A pellet according to claim 12, wherein said indentations comprise a plurality of elongated channels.

14. A pellet according to claim 13, wherein each of said channels has a profile in cross section which is selected from the group consisting essentially of a curved profile, a sine shaped profile, a U-shaped profile, and a V-shaped profile.

15. A pellet according to claim 13, wherein each of said channels has a profile in cross section which is selected from the group consisting essentially of a curved profile, a sine shaped profile, a rectangular shaped profile, a U-shaped profile, and a V-shaped profile.

16. A pellet according to claim 13, wherein each of said channels has a width of from 0.254 mm to 0.508 mm.

17. A pellet according to claim 12, having a top surface, a bottom surface, and four side surfaces, wherein three or more of said surfaces have said indentations.

18. A pellet according to claim 12, having a top surface, a bottom surface, and four side surfaces, wherein one or more sides has five or more indentations.

19. A pellet according to claim 12, wherein said indentations being sufficient in number to cause said exterior surface to define a first surface area of said body approximately 30 percent larger than the same exterior surface being flat and completely free from said indentations.

20. A pellet for use as an anode in a solid capacitor, comprising:
   a rectangular body comprised of compressed and sintered particles of conductive material, said body having an exterior surface comprising: a top surface, a bottom surface, and a plurality of side surfaces;
   said plurality of side surfaces being textured by a plurality of indentations increasing the surface area of said side surfaces;
   said indentations being sufficiently small in depth and width to cause said side surfaces and said top and bottom surfaces to define a first volume of said body approximately the same as a second volume defined by said top, bottom, and side surfaces being flat and completely free from said indentations.

21. A pellet according to claim 20, wherein said indentations comprise a plurality of elongated channels.

22. A pellet according to claim 21, wherein each of said channels has a profile in cross section which is selected from the group consisting essentially of a curved profile, a sine shaped profile, a U-shaped profile, and a V-shaped profile.

23. A pellet according to claim 21, wherein each of said channels has a profile in cross section which is selected from the group consisting essentially of a curved profile, a sine shaped profile, a rectangular shaped profile, a U-shaped profile, and a V-shaped profile.

24. A pellet according to claim 21, wherein each of said channels has a width of from 0.254 mm to 0.508 mm.

25. A pellet according to claim 20, having a top surface, a bottom surface, and four side surfaces, wherein three or more of said surfaces have said indentations.

26. A pellet according to claim 20, having a top surface, a bottom surface, and four side surfaces, wherein one or more sides has five or more indentations.

27. A pellet according to claim 20, wherein said indentations being sufficient in number to cause said exterior surface to define a first surface area of said body approximately 30 percent larger than the same exterior surface being flat and completely free from said indentations.

28. A pellet for use as an anode in a solid capacitor comprising:
   a rectangular body comprised of compressed and sintered particles of conductive material, said body comprising a top exterior surface, a bottom exterior surface, and four exterior side surfaces;
   said four exterior side surfaces all being textured by a plurality of indentations;
   wherein said indentations have a width of from 0.254 mm to 0.508 mm and a depth of from 0.254 mm to 0.508 mm.

29. The capacitor body of claim 28, further comprising:
   a lead electrically connected to said body;
   a conductive cathode coating at least partially covering said body;
   a first dielectric material electrically insulating said particles of conductive material from said conductive cathode coating;
   a second dielectric material covering at least a portion of said conductive cathode coating.

* * * * *